(12) United States Patent
Bando et al.

(10) Patent No.: US 8,964,778 B2
(45) Date of Patent: Feb. 24, 2015

(54) COMMUNICATION CONTROL DEVICE AND INFORMATION PROCESSING APPARATUS

(75) Inventors: Yoshifumi Bando, Kanagawa (JP);
Hiroaki Yamamoto, Kanagawa (JP);
Masahiko Kikuchi, Kanagawa (JP);
Yuichi Kawata, Kanagawa (JP);
Masakazu Kawashita, Kanagawa (JP);
Keita Sakakura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 114 days.

(21) Appl. No.: 12/567,813

(22) Filed: Sep. 28, 2009

(65) Prior Publication Data
US 2010/0246380 A1 Sep. 30, 2010

(30) Foreign Application Priority Data

Mar. 26, 2009 (JP) .................................. 2009-077527

(51) Int. Cl.
*G06F 5/06* (2006.01)
*G06F 1/32* (2006.01)
*H04L 1/18* (2006.01)
*H04L 7/04* (2006.01)

(52) U.S. Cl.
CPC ............ *G06F 1/3284* (2013.01); *G06F 1/3203* (2013.01); *G06F 1/3237* (2013.01); *H04L 1/1867* (2013.01); *H04L 7/041* (2013.01); *Y02B 60/1267* (2013.01)
USPC ............................ 370/463; 713/322; 713/600

(58) Field of Classification Search
CPC ............................ H04L 7/0016; H04L 7/0037
USPC ......... 370/431, 433, 449, 450, 458, 459, 463; 713/300, 310, 320, 322, 323, 600; 710/8, 14, 20
See application file for complete search history.

(56) References Cited

U.S. PATENT DOCUMENTS

| 5,796,787 A * | 8/1998 | Chen et al. ..................... 375/326 |
| 7,007,180 B2 * | 2/2006 | Hashimoto ..................... 713/320 |
| 2002/0144165 A1 * | 10/2002 | Wright et al. .................. 713/320 |

(Continued)

FOREIGN PATENT DOCUMENTS

| CN | 101087220 A | 12/2007 |
| JP | 2004-243533 A | 9/2004 |
| WO | 00/30333 A1 | 5/2000 |

OTHER PUBLICATIONS

Chinese Office Action issued Jun. 5, 2013, in CN Application 200910174022.9.

*Primary Examiner* — Curtis A Alia
(74) *Attorney, Agent, or Firm* — Sughrue Mion, PLLC

(57) ABSTRACT

A communication control device includes: a first processing unit that converts an electrical signal received by a communication channel into digital data and outputs the digital data, and in a second operation mode in which an amount of power supplied to the communication control device is lower than in a first operation mode, outputs a notification signal upon receiving an electrical signal indicating an arrival of packet data; a clock controller that, in the second operation mode, initiates supplying a clock signal upon receiving the notification signal; and a second processing unit that (i) has a receiving unit that extracts packet data from the digital data and outputs the extracted packet data, and (ii) in the second operation mode, stops receiving packet data during a time that the clock signal is not supplied, and upon reception of the clock signal, starts receiving packet data using the received clock signal.

11 Claims, 4 Drawing Sheets

(56) References Cited

U.S. PATENT DOCUMENTS

| | | | |
|---|---|---|---|
| 2003/0144020 A1* | 7/2003 | Challa et al. | 455/522 |
| 2003/0172310 A1* | 9/2003 | Moyer et al. | 713/300 |
| 2005/0188234 A1* | 8/2005 | Chang | 713/322 |
| 2006/0120441 A1* | 6/2006 | Nakagawa et al. | 375/152 |
| 2008/0046608 A1* | 2/2008 | Lee et al. | 710/30 |
| 2008/0162964 A1* | 7/2008 | Dahlen et al. | 713/320 |
| 2009/0219918 A1* | 9/2009 | Lee et al. | 370/350 |

\* cited by examiner

COMMUNICATION CONTROL DEVICE AND INFORMATION PROCESSING APPARATUS

CROSS-REFERENCE TO RELATED APPLICATIONS

This application is based on and claims priority under 35 U.S.C. 119 from Japanese Patent Application No. 2009-77527, which was filed on Mar. 26, 2009.

BACKGROUND

1. Technical Field

The present invention relates to a communication control device and an information processing apparatus.

2. Related Art

Some information processing apparatuses such as printers and personal computers include a normal driving mode in which normal operations are performed, and a power saving mode in which power consumption is suppressed so as to be lower than in the normal driving mode by stopping the supply of driving power to some devices or reducing the amount of driving power that is supplied.

SUMMARY

In an aspect of the invention, there id provided a communication control device including: a first processing unit that converts an electrical signal received by a communication channel into digital data and outputs the digital data, and in a second operation mode in which an amount of power supplied to the communication control device is lower than in a first operation mode, outputs a notification signal upon receiving an electrical signal indicating an arrival of packet data via the communication channel; a clock controller that, in the second operation mode, initiates supplying a clock signal upon receiving the notification signal; and a second processing unit that (i) has a receiving unit that extracts packet data from the digital data output by the first processing unit and outputs the extracted packet data, and (ii) in the second operation mode, stops receiving packet data during a time that the clock signal is not supplied from the clock controller, and upon reception of the clock signal from the clock controller, starts receiving packet data using the received clock signal.

BRIEF DESCRIPTION OF THE DRAWINGS

An exemplary embodiment of the invention will be described in detail based on the following figures, wherein.

DETAILED DESCRIPTION

(A) Configuration of Exemplary Embodiment

Below is a description of an exemplary embodiment of the invention with reference to the drawings.

Figure 1:
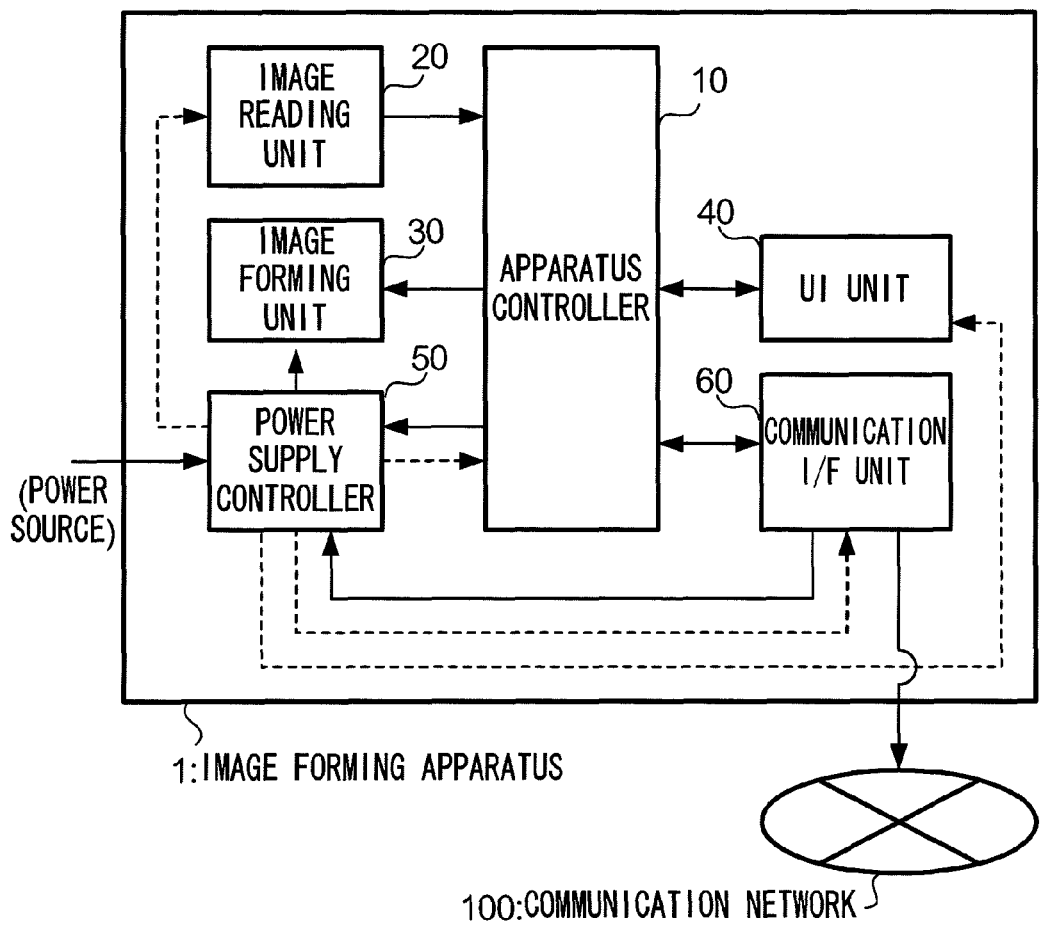
FIG. 1 is a block diagram showing a configuration of an image forming apparatus according to an exemplary embodiment of the invention.

FIG. 1 is a block diagram showing the configuration of an image forming apparatus 1 that is an exemplary embodiment of the invention. Note that solid line arrows in FIG. 1 indicate the flow of data related to control of units in the apparatus, and broken line arrows indicate the flow of power to the units in the apparatus.

The image forming apparatus 1 is an example of an information processing apparatus of the invention, and as shown in FIG. 1, the image forming apparatus 1 includes an apparatus controller 10, an image reading unit 20, an image forming unit 30, a UI (User Interface) unit 40, a power supply controller 50, and a communication interface (hereinafter, referred to as a "communication I/F unit") 60.

The apparatus controller 10 is provided with a memory and a calculation device that includes a CPU (Central Processing Unit), and the apparatus controller 10 controls the units in the image forming apparatus 1 in accordance with a control program stored in the memory. The image reading unit 20 is a so-called scanner, and the image reading unit 20 optically reads the surface of a recording medium such as a sheet, generates image information expressing the read image, and supplies the image information to the apparatus controller 10. The image forming unit 30 forms an image onto a recording sheet based on image information that has been supplied thereto. In other words, the apparatus controller 10 is an example of a processing execution unit of the invention, and the apparatus controller 10 executes processing for forming an image onto a recording sheet with use of data from the image reading unit 20 or the communication I/F unit 60. The UI unit 40 notifies information by images or audio based on control information from the apparatus controller 10, and the UI unit 40 includes a touch panel and various types of buttons. The power supply controller 50 is connected to the apparatus controller 10, the image reading unit 20, the image forming unit 30, the UI unit 40, and the communication I/F unit 60, in addition to a power source that is not shown in FIG. 1, and the power supply controller 50 adjusts the amount of power that is supplied to these units from the power source. The communication I/F unit 60 is an example of a communication control device of the invention, and the communication I/F unit 60 is constituted by an interface device that executes processing related to communication via a communication network 100.

The communication network 100 is an example of a communication channel of the invention, and in the present exemplary embodiment, the communication network 100 is a LAN (Local Area Network) for performing communication complying with an Ethernet (registered trademark) standard. Packet data is transferred on the communication network 100 based on various types of protocols such as TCP/IP (Transmission Control Protocol/Internet Protocol) and UDP/IP (User Datagram Protocol/Internet Protocol).

Figure 2:
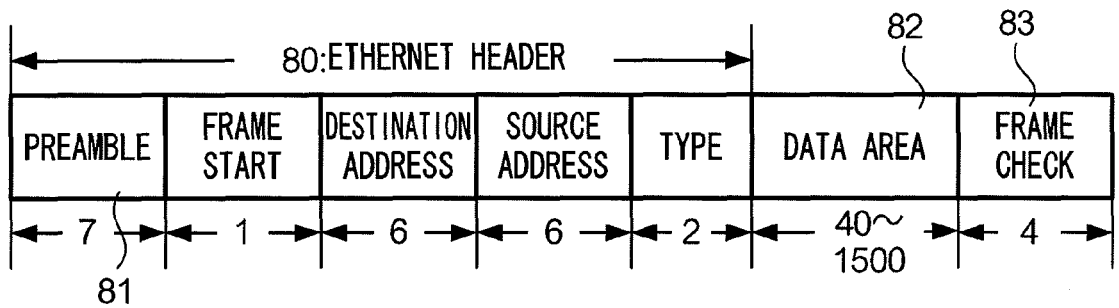
FIG. 2 is a diagram for describing the data structure of packet data used in communication complying with an Ethernet standard.

FIG. 2 is a diagram for describing the data structure of packet data used in communication complying with an Ethernet standard. Note that in FIG. 2, the numeric values shown under the parts of the packet data indicate the data amount of each data part in units of bytes.

As shown in FIG. 2, packet data handled in the present exemplary embodiment can be divided into the following main parts: an Ethernet header 80, a data area 82, and a frame check 83. The Ethernet header 80 includes a preamble 81 at the beginning thereof. The preamble 81 is data that is attached to the beginning of packet data, and is constituted by seven bytes of data in which, for example, "1" and "0" alternate repeatedly. The preamble 81 is used in communication complying with, for example, the 10BASE-T Ethernet standard, prevents the loss of data due to a delay in the start timing of data reception, and is used in applications such as an apparatus finding the beginning of packet data. In addition to the preamble 81, the Ethernet header 80 includes one byte of data indicating the start of the data frame of the packet data ("FRAME START" in FIG. 2), a destination address, a source address, and data indicating a protocol type. The data area 82 is 40 to 1,500 bytes of data related to, for example, image data supplied via the communication network 100. The frame check 83 is used for testing the validity of the frame content.

Figure 3:
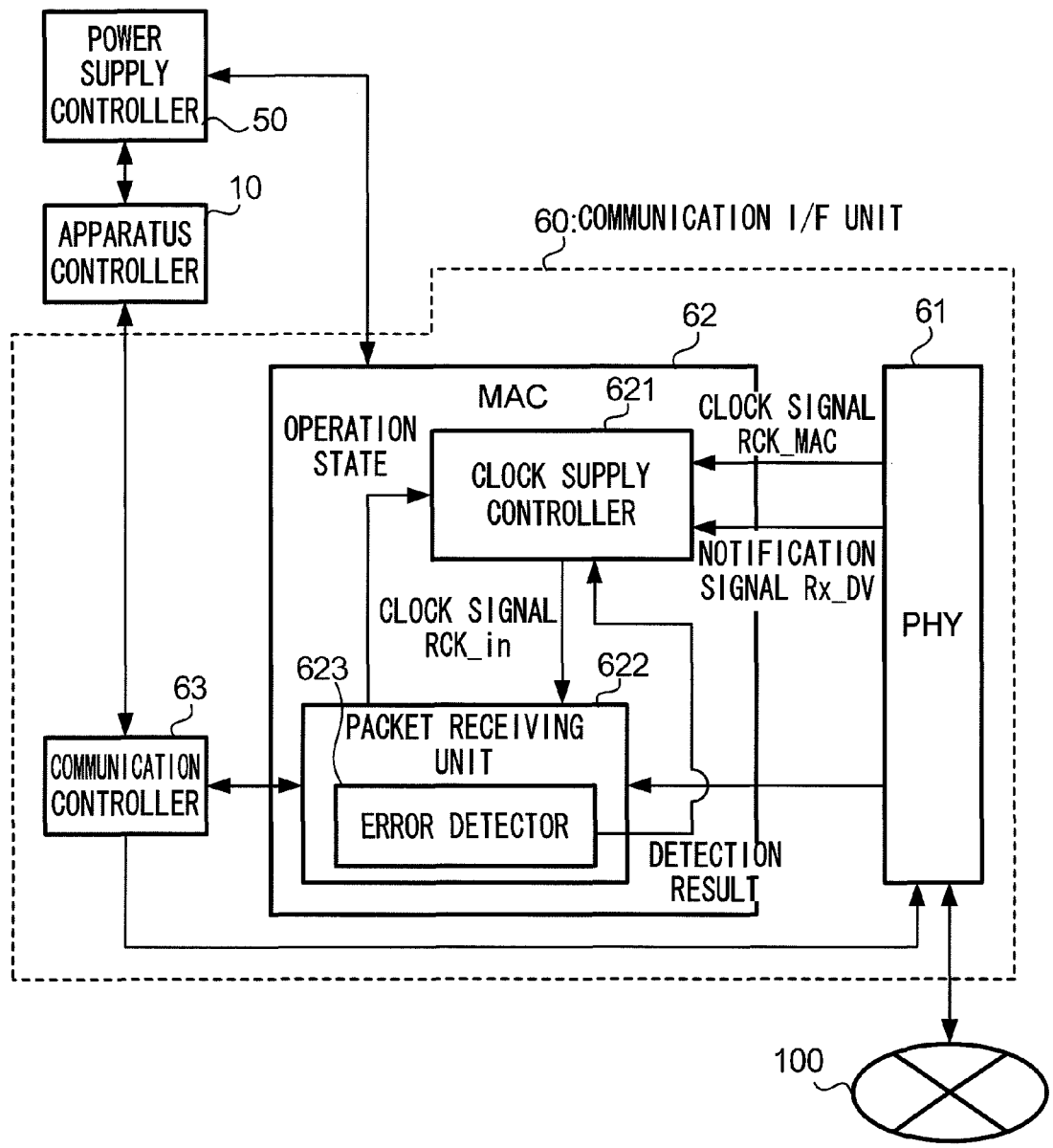
FIG. 3 is a block diagram showing a configuration of a communication I/F unit according to the exemplary embodiment.

Next is a description of the configuration of the communication I/F unit 60. FIG. 3 is a block diagram showing the configuration of the communication I/F unit 60. As shown in FIG. 3, the communication I/F unit 60 includes a physical layer conversion unit (hereinafter, called the "PHY") 61, a media access controller (hereinafter, called the "MAC") 62, and a communication controller 63. The functions of the communication I/F unit 60 are divided into a hierarchical structure based on the OSI model, and the functions are modularized for each layer.

The PHY 61 handles processing related to the physical layer in the OSI Reference Model, and is an example of a first processing unit of the invention. The PHY 61 is connected to the communication network 100, exchanges electrical signals with the communication network 100, and performs interconversion between such electrical signals and digital data used within the image forming apparatus 1. Specifically, the PHY 61 supplies a clock signal, which has been generated by and supplied from an oscillating device not shown in FIG. 3, as a clock signal RCK_MAC for synchronizing the MAC 62. Also, the PHY 61 converts an electrical signal expressing packet data that has arrived from the communication network 100 into digital data, and outputs the digital data to the MAC 62. Furthermore, the PHY 61 converts digital data that has been supplied from the communication controller 63 into an electrical signal, and outputs the electrical signal to the communication network 100.

The MAC 62 handles processing related to a lower sublayer in the data link layer of the OSI Reference Model, and is an example of a second processing unit of the invention. The MAC 62 has a clock supply controller 621, a packet receiving unit 622, and an error detector 623. These units operate upon receiving a supply of power from the power supply controller 50.

The clock supply controller 621 is an example of a clock supply controller of the invention, and the clock supply controller 621 has a CPU and a memory storing a control program for controlling the CPU. Note that the main constituents that realize the operations of the clock supply controller 621 are not limited to the CPU and the memory. Instead, a control circuit that can at least realize the control described below may be used. The clock supply controller 621 supplies a clock signal, which has been generated by and supplied from an oscillation device not shown in FIG. 3, as a clock signal RCK_in for causing the packet receiving unit 622 and the error detector 623 to operate. The clock supply controller 621 controls the supply of the clock signal RCK_in in accordance with various types of signals from the PHY 61 and the operation state of the units in the MAC 62. Also, the clock supply controller 621 acquires information related to an operation state from the packet receiving unit 622. Such information related to an operation state includes information indicating whether the packet receiving unit 622 has completed the reception of packet data.

The packet receiving unit 622 is an example of a packet receiving unit of the invention, and the packet receiving unit 622 performs filtering for extracting and receiving, from among packet data transferred via the communication network 100, only packet data required by the own apparatus. Upon receiving digital data from the PHY 61, the packet receiving unit 622 specifies packet data in units of packets from the digital data. Then, the packet receiving unit 622 performs filtering based on a predetermined condition, thus extracting, from among the specified packet data, only packet data that matches the condition, and outputs the extracted packet data to the communication controller 63.

Upon detecting that packet data was not normally received by the packet receiving unit 622 (hereinafter, called a "reception error"), the error detector 623 outputs a detection result to that effect to the clock supply controller 621. Here, the error detector 623 is constituted as part of the packet receiving unit 622, and is an example of a detector of the invention. The error detector 623 detects a reception error if, among the packet data having the data structure shown in FIG. 2, packet dropping has occurred in "FRAME START" or subsequent data. On the other hand, the error detector 623 does not detect a reception error if at least "FRAME START" and subsequent data have been normally received. In other words, even if part or the entirety of the preamble 81 included in the Ethernet header 80 is missing, as long as the other data has been normally received by the packet receiving unit 622, the error detector 623 does not detect a reception error. Note that it is sufficient to use a known configuration as the configuration related to the detection of such reception errors.

The communication controller 63 handles processing related to the other layers in the OSI Reference Model, and controls the transmission and reception of data between the apparatus controller 10 and the communication network 100. Specifically, the communication controller 63 outputs, to the PHY 61, packet data that has been supplied from the apparatus controller 10, and supplies, to the apparatus controller 10, packet data that has been supplied from the MAC 62 (packet receiving unit 622). The communication controller 63 retrieves data from the data area 82 of packet data, and supplies the retrieved data to the apparatus controller 10. The apparatus controller 10 executes processing with use of the data supplied from the communication controller 63. For example, if data included in the data area 82 corresponds to image data, the apparatus controller 10 restores the image data by combining data retrieved from multiple pieces of packet data.

The image forming apparatus 1 having the configuration described above is provided with two operation modes.

The first operation mode is a "normal driving mode" in which the power supply controller 50 supplies a predetermined amount of driving power to the apparatus controller 10, the image reading unit 20, the image forming unit 30, the UI unit 40, and the communication I/F unit 60, thus causing these units to be in a state of being able to execute processing. The second operation mode is a "power saving mode" in which the power supply controller 50 stops or reduces the supply of power to the apparatus controller 10, the image reading unit 20, the image forming unit 30, the UI unit 40, and the communication I/F unit 60, thus causing the power consumption of the image forming apparatus 1 as a whole to be lower than in the "normal driving mode". When the image forming apparatus 1 is operating in the "power saving mode", the amount of power supplied to the communication I/F unit 60 is reduced so as to be less than in the "normal driving mode", but a minimum required amount of power is ensured for allowing the communication I/F unit 60 to receive electrical signals from the communication network 100 and perform predetermined control in accordance with the received electrical signals.

When operating in the "normal driving mode", the apparatus controller 10 sets the units in the apparatus to either the "normal driving mode" or the "power saving mode" by controlling the supply of power to the units. For example, if a user has not performed an operation on the UI unit 40 for a predetermined time period such as 10 minutes, or if data has not been received from the communication network 100 via the communication I/F unit 60 for a predetermined time period, the apparatus controller 10 outputs, to the power supply controller 50, a transition instruction signal that instructs a transition from the "normal driving mode" to the "power saving mode". Upon receiving the transition instruction signal, the power supply controller 50 switches the units in the apparatus to power supply in the "power saving mode" by stopping the supply of power to the units or reducing the amount of supplied power.

On the other hand, when the apparatus controller 10 is operating in the "power saving mode", the units in the apparatus are set to either the "normal driving mode" or the "power saving mode" as a result of the power supply controller 50 controlling the supply of power to the units. For example, if the user performs an operation on the UI unit 40 when the power supply controller 50 is in the "power saving mode", the communication I/F unit 60 outputs a transition instruction signal that instructs the power supply controller 50 to revert to the "normal driving mode". In accordance with this transition instruction signal, the power supply controller 50 resumes power supply to the units in the apparatus in accordance with the "normal driving mode".

In this way, the apparatus controller 10 and the power supply controller 50 are examples of an operation mode setting unit that sets the operation mode of the own apparatus to either the "normal driving mode" or the "power saving mode". Also, upon being set to the "normal driving mode", the apparatus controller 10 executes processing with use of packet data that has been received in the "power saving mode".

The following describes operations performed by the units of the communication I/F unit 60 in the "normal driving mode" and the "power saving mode".

In the "normal driving mode", the PHY 61 is in the above-described state of being able to execute processing. On the other hand, in the "power saving mode", the PHY 61 receives a supply of the same amount of power as in the "normal driving mode" or an amount of power that has been reduced so as to be less than in the "normal driving mode", and the PHY 61 operates upon receiving a supply of a clock signal having a predetermined operation frequency from an oscillation device not shown in FIG. 3. Note that the operation frequency of the clock signal preferably has been reduced so as to be lower than in the "normal driving mode" in order to save power. In this "power saving mode", the PHY 61 continuously supplies the clock signal RCK_MAC and a notification signal Rx_DV to the clock supply controller 621 of the MAC 62. The clock signal RCK_MAC is a clock signal for synchronizing the MAC 62 as described above. The notification signal Rx_DV is a signal for notifying that the PHY 61 has received some sort of data (packet data) from the communication network 100. Specifically, the logical value of the digital data converted by the PHY 61 is "0" until an electrical signal expressing packet data has arrived. In contrast, when an electrical signal indicating the beginning of packet data has arrived, the logical value of the digital data converted by the PHY 61 becomes "1" due to the effect of the preamble 81 described above. When the logical value of the digital data changes from "0" to "1" in this way, the PHY 61 changes the logical value of the notification signal Rx_DV from "0" to "1", and outputs such notification signal Rx_DV. Accordingly, the PHY 61 notifies the clock supply controller 621 of the MAC 62 that an electrical signal expressing packet data has arrived. Upon receiving this notification, the clock supply controller 621 determines that packet data has arrived.

In the MAC 62, when in the "normal driving mode", the clock supply controller 621 supplies the clock signal RCK_in, thus causing the packet receiving unit 622 and the error detector 623 to operate. On the other hand, when in the "power saving mode", there is a time period during which the clock supply controller 621 does not supply the clock signal RCK_in. Accordingly, when in the "power saving mode", the packet receiving unit 622 and the error detector 623 stop operating, and the units of the MAC 62 are in a state in which operating is stopped.

(B) Operation of Exemplary Embodiment

Next is a description of operations executed by the image forming apparatus 1. This description pertains to operations performed in the case in which the communication I/F unit 60 has received packet data from the communication network 100 while the image forming apparatus 1 is operating in the "power saving mode". Note that at the point in time when the operations described below start, the clock supply controller 621 is not supplying the clock signal RCK_in, and the packet receiving unit 622 and the error detector 623 are stopped. For example, using the fact that the operation mode of the image forming apparatus 1 was switched from the "normal driving mode" to the "power saving mode" as a trigger, the clock supply controller 621 stops the supply of the clock signal RCK_in.

Figure 4:
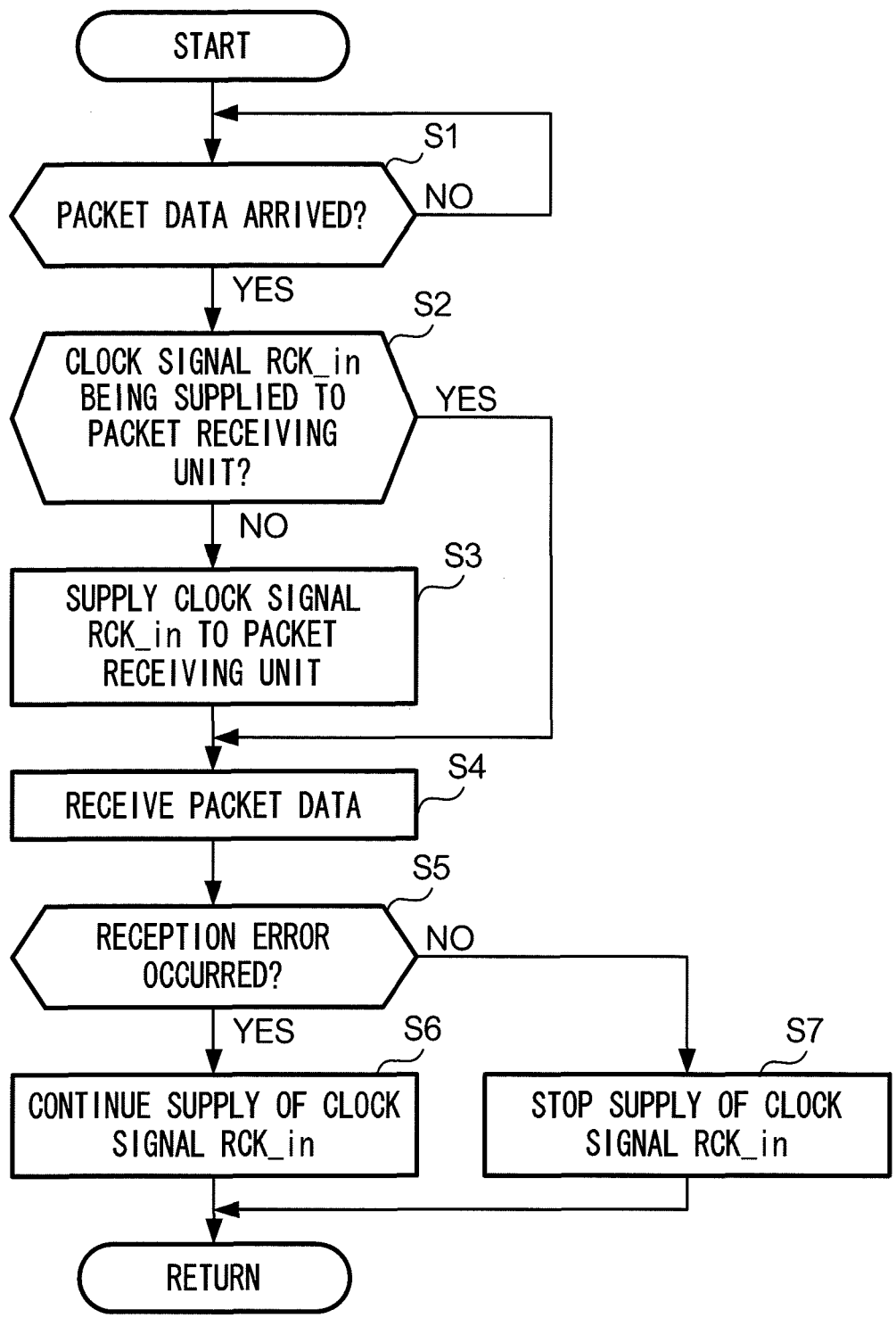
FIG. 4 is a flowchart showing a procedure of operations executed when the image forming apparatus according to the exemplary embodiment is in a "power saving mode"

FIG. 4 is a flowchart showing a procedure of processing executed when the image forming apparatus 1 is operating in the "power saving mode".

In the "power saving mode", the PHY 61 supplies the clock signal RCK_MAC and the notification signal Rx_DV whose logical value is "0" to the clock supply controller 621 while an electrical signal expressing packet data is not being received (step S1: NO). Then, upon receiving an electrical signal indicating that the beginning of packet data has arrived, the PHY 61 accordingly changes the logical value of the notification signal Rx_DV from "0" to "1", and outputs such notification signal Rx_DV. Upon receiving the notification signal Rx_DV whose logical value is "1", using this as a trigger, the clock supply controller 621 determines that packet data has arrived (step S1: YES).

Upon determining "YES" in step S1, the clock supply controller 621 determines whether the clock signal RCK_in is being supplied to the packet receiving unit 622 (step S2). Here, the clock supply controller 621 determines that the clock signal RCK_in is not being supplied (step S2: NO), and therefore processing proceeds to step S3. Next, the clock supply controller 621 starts the supply of the clock signal RCK_in to the packet receiving unit 622 and the error detector 623 (step S3). In accordance with this supply, the packet receiving unit 622 and the error detector 623 start operating. Upon starting packet reception, the packet receiving unit 622 receives digital data supplied from the PHY 61, specifies packet data in units of packets from the digital data, and receives the specified packet data (step S4).

Next, the clock supply controller 621 determines whether a reception error has been detected by the error detector 623 (step S5). The packet receiving unit 622 starts operating upon receiving the supply of the clock signal RCK_in from the clock supply controller 621, and thereafter starts receiving packet data. Meanwhile, electrical signals expressing packet data having the data structure shown in FIG. 2 are successively supplied to the PHY 61, and digital data is output to the MAC 62. Accordingly, there are cases in which digital data that has arrived up to when operations pertaining to packet data reception have begun is dropped instead of received by the packet receiving unit 622. Such a reception error readily occurs in the case in which, for example, packet data having a preamble 81 whose length is shorter than the length specified in the Ethernet standard has been supplied via the communication network 100.

(B-1) Case in which a Reception Error has not Occurred

Here, assume that the clock supply controller 621 has determined that at least data from "FRAME START" onward has been received by the packet receiving unit 622, and that a reception error has not been detected by the error detector 623 (step S5: NO). In this case, the packet receiving unit 622 outputs the received packet data. The packet receiving unit 622 stores data corresponding to the received packet data by, for example, transferring the data to a storage device not shown in the drawings. Then, upon receiving, from the packet receiving unit 622, a signal indicating an operation state in which the reception of packet data has been completed, the clock supply controller 621 stops the supply of the clock signal RCK_in to the packet receiving unit 622 and the error detector 623 (step S7). Accordingly, the packet receiving unit 622 and the error detector 623 stop, and in the "power saving mode", the units of the MAC 62 again transition to the state in which operating is stopped.

(B-2) Case in which a Reception Error has Occurred

On the other hand, assume that the packet receiving unit 622 has dropped data from "FRAME START" onward, and the error detector 623 has supplied a detection result indicating the occurrence of a reception error to the clock supply controller 621 (step S5: YES). In this case, the clock supply controller 621 continues the supply of the clock signal RCK_in to the packet receiving unit 622 and the error detector 623 (step S6). Also, the communication I/F unit 60 waits without changing its state. This is because if such a packet data reception error has occurred, an apparatus on the data transmission side may determine that the transmission was not normally performed, and again transmit the same data.

When an electrical signal expressing packet data that has been retransmitted due to the reception error (hereinafter, called "retransmission data") has arrived, the clock supply controller 621 again determines "YES" in step S1, and processing proceeds to step S2. Here, the clock supply controller 621 determines that the clock signal RCK_in is already being supplied (step S2: YES), and therefore processing proceeds to step S4. Next, the packet receiving unit 622 receives digital data expressing the retransmission data from the PHY 61, and receives packet data from the digital data (step S4). Here, the packet receiving unit 622 has been operating since before the PHY 61 transmitted the retransmission data, and therefore a packet data reception error due to a delay in operation does not occur. Then, upon determining that a reception error has not been detected by the error detector 623 (step S5: NO), the clock supply controller 621 stops the supply of the clock signal RCK_in to the packet receiving unit 622 and the error detector 623 (step S7), and the units of the MAC 62 again transition to the state in which operating is stopped.

Hereafter as well, the communication I/F unit 60 operates in accordance with the procedure described above each time the PHY 61 receives an electrical signal expressing packet data.

According to the exemplary embodiment described above, since in the "power saving mode" there is a time period in which the clock supply controller 621 does not supply the clock signal RCK_in to the packet receiving unit 622, and the packet receiving unit 622 and the error detector 623 have been put in a state in which their operation is stopped, the power consumption of the module that executes processing related to communication is reduced so as to be lower than a configuration in which the module that receives packet data (the module corresponding to the packet receiving unit 622) operates even in the "power saving mode". For example, the inventors of the invention confirmed that in an image forming apparatus manufactured by the applicant of the invention, the supply of a clock signal to approximately 350,000 gates provided in the MAC is stopped, thus realizing a reduction in power consumption by suppressing the occurrence of leakage current due to the operation of such gates. Also, using the fact that packet data has arrived as a trigger, the clock supply controller 621 starts the supply of the clock signal RCK_in to the packet receiving unit 622 and the error detector 623, thus causing the packet receiving unit 622 and the error detector 623 to operate. Accordingly, there is the risk that a reception error will occur depending on the time period from when the packet data has arrived until when the packet receiving unit 622 has started operating. Even in this case, if the error detector 623 has detected that a reception error has occurred, the clock supply controller 621 continues the supply of the clock signal RCK_in, and the packet receiving unit 622 reliably receives retransmission data.

(C) Exemplary Variations

The present invention can be embodied differently from the exemplary embodiment described above. Also, combinations of the exemplary variations described below are possible.

(C-1) First Exemplary Variation

Although an example in which the communication I/F unit 60 is included in the image forming apparatus 1 is described in the above exemplary embodiment, the present invention is not limited to the communication I/F unit 60 being included in an image forming apparatus. For example, the present invention can be applied to an apparatus including a device (module) that executes processing related to communication, such as a personal computer or communication modem. Also, since the processing performed by an information processing apparatus with use of packet data varies depending on the apparatus, there is no limitation on the content of such processing. In particular, image forming apparatuses generally operate in the "power saving mode" longer than personal computers and the like, and therefore a large power saving effect is realized by this configuration of the present invention.

Also, the "power saving mode" refers to an operation mode of operating by a smaller amount of power than in the "normal driving mode". Accordingly, although various operation modes such as "sleep mode" and "standby mode" are provided depending on the model and manufacturer of the apparatus, all such operation modes are also included in the concept of the second operation mode, that is to say, the "power saving mode" of the present invention.

(C-2) Second Exemplary Variation

The communication I/F unit 60 of the above-described exemplary embodiment may be configured as described below.

Figure 5:
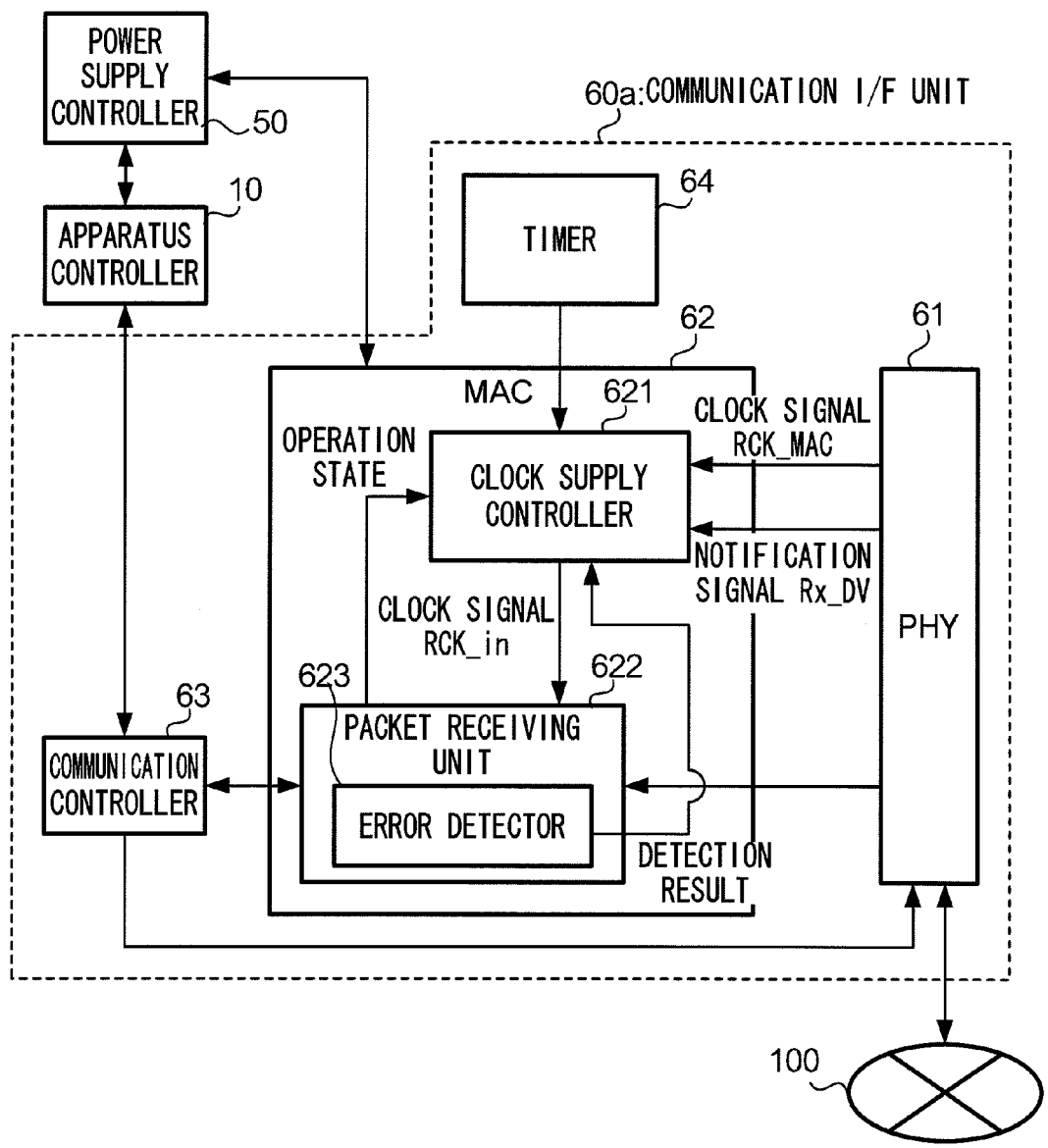
FIG. 5 is a block diagram showing a configuration of a communication I/F unit according to an exemplary variation of the invention.

FIG. 5 is a block diagram showing the configuration of a communication I/F unit 60a according to the present exemplary variation. Note that in FIG. 5, constituent elements that are the same as in the communication I/F unit 60 of the exemplary embodiment have been given the same reference characters, and descriptions thereof have been omitted since the operations of such constituent elements are also the same.

As shown in FIG. 5, the communication I/F unit 60a includes a timer 64 that measures times. The timer 64 has an oscillation circuit that has, for example, a crystal oscillator, and the timer 64 measures time based on a vibration signal output from the oscillation circuit. The timer 64 supplies time information indicating the measured time to the clock supply controller 621. If the error detector 623 has detected that packet data has not been normally received (i.e., if an error has been detected), based on the result of timing performed by the timer 64, the clock supply controller 621 continues the supply of the clock signal to the packet receiving unit 622 for a predetermined time period (e.g., 10 seconds) beginning when the error was detected, and when the time period has elapsed, the clock supply controller 621 stops the supply of the clock signal to the packet receiving unit 622.

If a packet data reception error has been detected, the clock supply controller 621 of the communication I/F unit 60 continues the supply of the clock signal RCK_in until retransmission data has been received, but there are cases in which the transmission of retransmission data is interrupted, or the transmission of retransmission data is not performed depending on the apparatus of the other party. In such cases, the clock supply controller 621 stops the supply of the clock signal RCK_in when a time period during which retransmission data has not arrived has exceeded a predetermined length, thus reducing wasteful consumption of power due to waiting for retransmission data. Note that in this configuration, the timer 64 may be provided within the MAC 62, or external to the communication I/F unit. Also, a configuration is possible in which the timer 64 outputs information indicating the time itself, and the clock supply controller 621 determines the elapsed time period, and a configuration is possible in which the timer 64 outputs a signal indicating that a predetermined time period has elapsed since a reception error occurred.

(C-3) Third Exemplary Variation

Although the error detector 623 is provided as part of the configuration of the packet receiving unit 622 in the exemplary embodiment described above, these units may be provided separately. In this case, a configuration is possible in which only the packet receiving unit 622 is the target of the supply of the clock signal RCK_in by the clock supply controller 621. In this case, power consumption is reduced compared to conventional technology to the extent that the packet receiving unit 622 does not operate even if the error detector 623 enters the operation state upon receiving the supply of a clock signal from another module. In other words, it is sufficient for the clock supply controller 621 to control the supply of the clock to at least the packet receiving unit 622.

Although the MAC 62 has the clock supply controller 621 in the exemplary embodiment described above, a configuration is also possible in which the clock supply controller 621 is provided external to the MAC 62 of the communication I/F unit 60.

(C-4) Fourth Exemplary Variation

In the exemplary embodiment described above, the error detector 623 detects that a reception error has occurred in the "power saving mode", and in accordance with such detection result, the clock supply controller 621 controls whether the supply of the clock signal RCK_in is continued or stopped. Alternatively, a configuration is possible in which the communication I/F unit 60 does not have the error detector 623. Even with this configuration, in the "power saving mode" there is a time period in which the clock supply controller 621 does not supply the clock signal RCK_in, and therefore power consumption is suppressed so as to be lower than in a conventional configuration in which the operation state of the packet receiving unit 622 is maintained.

Also, although the clock supply controller 621 supplies the clock signal RCK_in to the packet receiving unit 622 and the error detector 623 in the exemplary embodiment described above, a configuration is possible in which another module in the MAC supplies the clock signal, and with this configuration as well, the supply of the clock signal is stopped in the "power saving mode", thus achieving the power saving effect.

(C-5) Fifth Exemplary Variation

Although the communication network 100 of the exemplary embodiment described above is a LAN for performing communication complying with an Ethernet standard, communication complying with another standard may be performed. Also, another type of communication channel such as the Internet may be used, and there is no limitation on the type of communication channel. Furthermore, the communication network 100 may be a wired communication channel, a wireless communication channel, or a combination of these.

Moreover, although the functions of the communication I/F unit 60 of the exemplary embodiment described above are divided into a hierarchical structure based on the OSI model, the present invention can be applied as long as the module that executes processing related to communication is a module having functionality that corresponds to a first processing unit and a second processing unit of the present invention.

Additionally, although the clock supply controller 621 and the error detector 623 are used in both the "normal driving mode" and the "power saving mode" in the exemplary embodiment described above, a configuration is possible in which these units operate only in the "power saving mode", and the functionality of such constituent elements is realized by other modules in the "normal driving mode".

Furthermore, although the supply of power to the apparatus controller 10, the image reading unit 20, the image forming unit 30, the UI unit 40, and the communication I/F unit 60 is reduced or stopped in the "power saving mode" in the exemplary embodiment described above, this configuration related to power supply is merely one example. It is sufficient for at least the amount of power supplied to the communication I/F unit 60 in the "power saving mode" to be reduced, and for the power to be supplied in an amount that enables the communication I/F unit 60 to operate as described in the exemplary embodiment.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication control device comprising:
   a converter that converts an electrical signal received by a communication channel into digital data and outputs the digital data, and in a second operation mode in which an amount of power supplied to the communication control device is lower than in a first operation mode, outputs a notification signal upon receiving an electrical signal indicating an arrival of packet data via the communication channel;
   a clock controller that, in the second operation mode, initiates supplying a clock signal to a receiver upon receiving the notification signal; and
   a controller that (i) comprises the receiver operable by the clock signal supplied by the clock controller, wherein the receiver extracts the packet data from the digital data output by the converter and outputs the extracted packet data, and (ii) in the second operation mode, stops receiving the packet data during a time that the clock signal is not supplied from the clock controller, and upon reception of the clock signal from the clock controller, starts receiving the packet data using the received clock signal,
   wherein the controller includes a detector that detects whether an error exists, the error being caused by a delayed supply of the clock signal resulting in a delay in operation of the receiver, in receiving the packet data at the receiver,
   wherein, after the clock controller initiates supplying the clock signal to the receiver in the second operation mode, the clock controller determines whether or not the detector detects the error and:
      in response to the clock controller determining that the detector detects the error, the clock controller continues supplying the clock signal to the receiver for a predetermined length of time beginning at the detection of the error, even while no packet data is being received by the receiver, and after the predetermined length of time elapses, the clock controller stops supplying the clock signal to the receiver, and
      in response to the clock controller determining that no error is detected by the detector, the clock controller stops supplying the clock signal to the receiver, and
   wherein the predetermined length of time is set to allow the receiver to receive a retransmission of the erroneously received packet data.

2. The communication control device according to claim 1, further comprising a timer,
   wherein when the detector identifies an error referring to the timer, the clock controller continues supplying the clock signal to the receiver for the predetermined length of time beginning at the detection of the error, and after the predetermined length of time elapses, the clock controller stops supplying the clock signal to the receiver.

3. The communication control device according to claim 2, wherein the converter performs processing on a physical layer of the OSI Reference Model, and the controller performs processing on a lower sublayer of a data link layer of the OSI Reference Model.

4. The communication control device according to claim 1, wherein the converter performs processing on a physical layer of the OSI Reference Model, and
   the controller performs processing on a lower sublayer of a data link layer of the OSI Reference Model.

5. The communication control device according to claim 1, wherein the detector detects the error in receiving packet data at the receiver if packet dropping has occurred in a "FRAME START" section of an Ethernet header or subsequent data of a packet, but does not detect the error in receiving packet data at the receiver if part of a preamble of the Ethernet header of the packet is missing so long as no packet dropping has occurred in the "FRAME START" section or subsequent data of the packet.

6. The communication control device according to claim 1, wherein if, after the clock controller initiates supplying the clock signal to the receiver in the second operation mode, the detector detects the error, then the clock controller continues supplying the clock signal to the receiver until the receiver receives the retransmission of the erroneously received packet data.

7. The communication control device according to claim 1, wherein the second operation mode is maintained while the clock controller initiates supplying the clock signal to the receiver upon receiving the notification signal, and the clock controller determines whether or not the detector detects the error.

8. The communication control device according to claim 1, wherein the error relates to packet data subsequent to a preamble.

9. An information processing apparatus comprising:
   a converter that converts an electrical signal received by a communication channel into digital data and outputs the digital data, and in a second operation mode in which an amount of power supplied to the information processing apparatus is lower than in a first operation mode, outputs a notification signal upon receiving an electrical signal indicating an arrival of packet data by the communication channel;
   a clock controller that, in the second operation mode, initiates supplying a clock signal to a receiver upon receiving the notification signal;
   a controller that (i) comprises the receiver operable by the clock signal supplied by the clock controller, wherein the receiver extracts the packet data from the digital data output by the converter and outputs the extracted packet data, and (ii) in the second operation mode, stops receiving the packet data during a time that the clock signal is not supplied from the clock controller, and upon reception of the clock signal from the clock controller, starts receiving the packet data using the received clock signal;
   a second controller that sets an operation mode to one of the first operation mode and the second operation mode; and
   a third controller that, when the first operation mode is set, executes processing using the packet data received by the receiver,
   wherein the controller includes a detector that detects whether an error exists, the error being caused by a delayed supply of the clock signal resulting in a delay in operation of the receiver, in receiving the packet data at the receiver, and
   wherein, after the clock controller initiates supplying the clock signal to the receiver in the second operation mode, the clock controller determines whether or not the detector detects the error and:

in response to the clock controller determining that the detector detects the error, the clock controller continues supplying the clock signal to the receiver for a predetermined length of time beginning at the detection of the error, even while no packet data is being received by the receiver, and after the predetermined length of time elapses, the clock controller stops supplying the clock signal to the receiver, and in response to the clock controller determining that no error is detected by the detector, the clock controller stops supplying the clock signal to the receiver, and wherein the predetermined length of time is set to allow the receiver to receive a retransmission of the erroneously received packet data.

10. The information processing apparatus according to claim 9, further comprising a timer, wherein when the detector identifies an error referring to the timer, the clock controller continues supplying the clock signal to the receiver for the predetermined length of time beginning at the detection of the error, and after the predetermined length of time elapses, the clock controller stops supplying the clock signal to the receiver.

11. The information processing apparatus according to claim 10, wherein the converter performs processing on a physical layer of the OSI Reference Model, and the controller performs processing on a lower sublayer of a data link layer of the OSI Reference Model.

* * * * *